(12) United States Patent
Jackson et al.

(10) Patent No.: US 9,315,722 B1
(45) Date of Patent: Apr. 19, 2016

(54) METHODS FOR IMPROVING FRICTION REDUCTION IN AQUEOUS BRINE

(71) Applicant: Kemira Oyj, Helsinki (FI)

(72) Inventors: Logan Jackson, Norcross, GA (US); Harsha Kolla, Cumming, GA (US)

(73) Assignee: Kemira Oyj, Helsinki (FI)

( * ) Notice: Subject to any disclaimer, the term of this patent is extended or adjusted under 35 U.S.C. 154(b) by 418 days.

(21) Appl. No.: 13/632,435

(22) Filed: Oct. 1, 2012

Related U.S. Application Data

(60) Provisional application No. 61/541,549, filed on Sep. 30, 2011.

(51) Int. Cl.
*C09K 8/82* (2006.01)

(52) U.S. Cl.
CPC .................................... *C09K 8/82* (2013.01)

(58) Field of Classification Search
None
See application file for complete search history.

(56) References Cited

U.S. PATENT DOCUMENTS

| | | | |
|---|---|---|---|
| 3,215,680 A | 11/1965 | Kolodny | |
| 3,254,719 A | 6/1966 | Root | |
| 3,405,106 A | 10/1968 | Stephen | |
| 3,572,354 A | 3/1971 | Malone et al. | |
| 3,868,328 A | 2/1975 | Boothe et al. | |
| 4,242,247 A | 12/1980 | Pellon et al. | |
| 4,363,886 A * | 12/1982 | Lipowski et al. | 523/336 |
| 4,379,883 A | 4/1983 | Zecher | |
| 4,500,437 A | 2/1985 | Engelhardt et al. | |
| 4,552,670 A * | 11/1985 | Lipowski et al. | 507/120 |
| 4,681,912 A | 7/1987 | Durand et al. | |
| 5,034,062 A * | 7/1991 | Lein et al. | 106/416 |
| 5,076,508 A | 12/1991 | Arnold et al. | |
| 5,407,909 A * | 4/1995 | Goodhue et al. | 507/118 |
| 7,004,254 B1 | 2/2006 | Chatterji et al. | |
| 7,232,793 B1 * | 6/2007 | King | C09K 8/035 507/120 |
| 7,271,134 B2 | 9/2007 | King et al. | |
| 8,640,774 B1 * | 2/2014 | Frederick | C09K 8/62 166/300 |
| 2011/0009299 A1* | 1/2011 | van Zanten | 507/129 |

FOREIGN PATENT DOCUMENTS

| | | |
|---|---|---|
| DE | 3248655 | 7/1984 |
| EP | 0107226 | 5/1984 |
| EP | 0115589 | 8/1984 |
| FR | 2678629 | 1/1993 |
| WO | WO 2007/068876 | 11/2006 |

\* cited by examiner

*Primary Examiner* — John J Figueroa

(74) *Attorney, Agent, or Firm* — King & Spalding

(57) ABSTRACT

Methods for improving friction reduction properties of an aqueous treatment fluid are provided, wherein the resultant aqueous treatment fluid has an improvement in friction reduction, when compared to a similar aqueous treatment fluid in which the inverted emulsion does not contain salt.

12 Claims, No Drawings

METHODS FOR IMPROVING FRICTION REDUCTION IN AQUEOUS BRINE

CROSS-REFERENCE TO RELATED APPLICATION

This application claims priority to U.S. Provisional Application 61/541,549, filed Sep. 30, 2011, which is incorporated herein by reference in its entirety.

FIELD OF THE ART

The present disclosure generally relates to methods for reducing friction in aqueous brines, and more particularly, to improving friction reduction in aqueous brines by inverting an inverse emulsion comprising a friction reducing polymer and an inorganic salt.

BACKGROUND

In the drilling, completion, and stimulation of oil and gas wells, well treatment fluids are often pumped into well bore holes under high pressure and at high flow rates causing the rock formation surrounding the well bore to fracture. As the fluid is pumped through the pipe at high flow rates (thousands of GPM) there is a significant amount of frictional resistance, which results in large energy requirements.

In order to reduce the friction between the well treatment fluid and the bore linings, friction pressure reducing additives have been combined with the treatment fluids and added during pumping so as to reduce pump pressure. For example, a type of well treatment commonly utilized for stimulating hydrocarbon production from a subterranean zone penetrated by a well bore is hydraulic fracturing. Hydraulic fracturing, also referred to as fraccing (or fracking), is used to initiate production in low-permeability reservoirs and re-stimulate production in older producing wells. In hydraulic fraccing, a fluid composition is injected into the well at pressures effective to cause fractures in the surrounding rock formation. Fraccing is used both to open up fractures already present in the formation and create new fractures.

Water soluble polymers can be used as friction reducers in well treatment fluids to alter the rheological properties of the fluid so that the turbulent flow is minimized, thereby preventing consequent energy loss in the fluid as it is pumped through the pipe. These types of treatments are often called "slick water treatments or slick water fracs." In some instances, water soluble friction reducing polymers are suspended in water in oil emulsions, wherein upon addition to the aqueous treatment fluid, the emulsion must invert to release the friction reducing polymer into the fluid. Performance in the field depends upon the ability of the emulsions to invert, or break, quickly. Certain conditions, for example high brine conditions, can hinder the breaking of the emulsion. In particular, high brines including potassium chloride, sodium chloride, seawater and other API base brines that include calcium or magnesium hardness interfere with the inversion of emulsion polymers such that the emulsions do not break or generate the rheology needed to accomplish superior friction reduction.

BRIEF SUMMARY

Disclosed herein are methods for improving friction reduction properties of an aqueous treatment fluid, comprising: (i) providing a water in oil emulsion comprising: (a) from about 10% to about 35% by weight friction reducing copolymer; (b) at least about 3% by weight of an inorganic salt; and (c) an inverting surfactant; and (ii) inverting the emulsion in an aqueous treatment fluid containing brine; wherein the resultant aqueous treatment fluid has an improvement in friction reduction, when compared to a similar aqueous treatment fluid in which the inverted emulsion does not contain inorganic salt.

The disclosure may be understood more readily by reference to the following detailed description of the various features of the disclosure and the examples included therein.

DETAILED DESCRIPTION

The present disclosure provides methods for reducing friction in aqueous brines. The methods generally relate to improving friction reduction in aqueous brines by inverting an inverse emulsion comprising a friction reducing polymer and a salt. The methods provide an improvement over inverting an inverse emulsion comprising a friction reducing copolymer in the absence of salt. Advantageously, the combination of the friction reducing polymer and the salt provides an unexpected and synergistic effect so as to provide rapid and enhanced polymer inversion, where applicable, and increased friction reduction, among other advantages, in aqueous brines. In certain embodiments, a water soluble inorganic salt is included in the emulsion prior to polymerization to form the friction reducing polymer.

DEFINITIONS

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units.

The term "friction reducing polymer" refers to a polymer that reduces losses due to friction between an aqueous fluid in turbulent flow and tubular goods, e.g. pipes, coiled tubing, and the like, and/or formation. The friction reducing polymer is not intended to be limited to any particular type and may be synthetic polymers, natural polymers, or viscoelastic surfactants. Suitable friction reducing polymers are typically latex polymers or copolymers of acrylamides, acrylates, polyisobutylene, guar gum, polyethylene oxide, and combinations thereof. They are added to slick water treatments at concentrations of 0.1 to 5 pounds per 1000 gallons of stimulation fluid. In other embodiments, the friction reducing polymer is added at a concentration of 0.25 to about 2.5 pounds per 1000 gallons of stimulation fluid. The friction reducing polymers may be anionic, cationic, amphoteric or non-ionic depending on desired application. In addition, various combinations can be used including but not limited to hydrophilic/hydrophobic combinations, functionalized natural and/or synthetic blends of the above, or the like. The friction reducing polymers may be anionic, cationic, amphoteric or non-ionic depending on desired application. In addition, various combinations can be used including but not limited to hydrophilic/hydrophobic combinations, functionalized natural and/or synthetic blends of the above, or the like.

The term "anionic monomer" refers to a monomer which possesses a negative charge. Representative anionic monomers include acrylic acid, sodium acrylate, ammonium acrylate, methacrylic acid, 2-acrylamido-2-methylpropanesulfonic acid (AMPS), vinyl sulfonic acid, styrene sulfonic acid, maleic acid, sulfopropyl acrylate or methacrylate or other water-soluble forms of these or other polymerisable carboxylic or sulphonic acids, sulfomethylated acrylamide, allyl sulfonate, itaconic acid, acrylamidomethylbutanoic acid, fumaric acid, vinylphosphonic acid, allylphosphonic acid, phosphonomethylated acrylamide, and the like, and salts thereof. Exemplary salts of these anionic monomers include but are not limited to sodium and ammonium salts.

The term "cationic monomer" refers to a monomer which possesses a positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride.

The term "brine" or "aqueous brine" as used herein refers to sea water; naturally-occurring brine; a chloride-based, bromide-based, formate-based, or acetate-based brine containing monovalent and/or polyvalent cations or combinations thereof. Examples of suitable chloride-based brines include without limitation sodium chloride and calcium chloride. Further without limitation, examples of suitable bromide-based brines include sodium bromide, calcium bromide, and zinc bromide. In addition, examples of formate-based brines include without limitation, sodium formate, potassium formate, and cesium formate.

Friction Reducing Polymers

In one embodiment, the friction reducing polymers are typically latex polymers or copolymers of acrylamides, acrylates, polyisobutylene, guar gum, polyethylene oxide, and combinations thereof. In certain embodiments the friction reducing polymer is a copolymer. In one embodiment, the friction reducing polymer is an anionic polymer. In a particular embodiment, the anionic polymer has about 10% to about 50% charge, about 15% to about 45% charge, about 20% to about 40% charge, or about 25% to about 35% charge. In one embodiment, the friction reducing polymer is a cationic polymer. In a particular embodiment, the cationic polymer has about 10% to about 50% charge. In one embodiment, the friction reducing polymer is an amphoteric polymer. In one embodiment, the friction reducing polymer is a non-ionic polymer.

In one embodiment, the friction reducing polymer comprises acrylic acid and/or acrylamide. In one embodiment, the friction reducing polymer comprises about 10% to about 60% acrylic acid by weight. In certain embodiments, the friction reducing polymer comprises about 10% to about 40% acrylic acid by weight.

In one embodiment, the friction reducing polymer comprises one or more monomers selected from acrylamide; acrylic acid; 2-acrylamido-2-methylpropane sulfonic acid; N,N-dimethylacrylamide, vinyl sulfonic acid; N-vinyl acetamide; N-vinyl formamide; and mixtures thereof.

In one embodiment, the friction reducing polymer comprises one or more anionic monomers.

In a particular embodiment, the friction reducing polymer comprises one or more cationic monomers.

The friction reducing polymers of the present embodiments should be included in the aqueous treatment fluids in an amount sufficient to provide the desired reduction of friction. In some embodiments, a friction reducing polymer may be present in an amount in the range of from about 0.1 to about 40 Gallons Per Thousand Gallons of the aqueous treatment fluid (GPTG). In some embodiments, a friction reducing polymer may be present in an amount in the range of from about 0.25 to about 1 GPTG of the aqueous treatment fluid.

The friction reducing polymers can be added to slick water treatments at concentrations of 0.1 to 40 GPTG of stimulation fluid. In other embodiments, the friction reducing polymer is added at a concentration of 0.25 to about 2.5 GPTG of stimulation fluid.

The friction reducing polymers of the present embodiments should have a molecular weight sufficient to provide a desired level of friction reduction. Generally, friction reducing polymers having higher molecular weights may be needed to provide a desirable level of friction reduction. For example, in some embodiments, the weight average molecular weight of the friction reducing polymers may be in the range of from about 7,500,000 to about 30,000,000, as determined using intrinsic viscosities. Those of ordinary skill in the art will recognize that friction reducing polymers having molecular weights outside the listed range may still provide some degree of friction reduction in the aqueous treatment fluid.

Suitable friction reducing polymers of the present embodiments may be in an acid form or in a salt form. A variety of salts may be made by neutralizing the acid form of the acrylic acid monomer and/or the 2-acrylamido-2-methylpropane sulfonic acid monomer with a base, such as sodium hydroxide, ammonium hydroxide or the like. As used herein, the term "polymer" is intended to include both the acid form of the friction reducing copolymer and its various salts.

The friction reducing polymers suitable for use in the present embodiments may be made in accordance with any of a variety of polymerization methods. In one embodiment, a suitable friction reducing polymer may be prepared using emulsion polymerization. Those of ordinary skill in the art, with the benefit of this disclosure, will recognize an appropriate polymerization method to synthesize a suitable friction reducing polymer. The present embodiments do not lie in the polymerization method used to synthesize the friction reducing polymers of the present embodiments so long as it yields the desired friction reducing polymer.

After polymerization, the friction reducing polymer may be provided in any suitable form, including in a solid form, suspended in an oil-external, or water-in-oil, polymer emulsion, or as a component of an aqueous solution. Suspension of the friction reducing polymers in an oil-external or water-in-oil polymer emulsion will be described in more detail below.

Salts

The emulsions for use in the embodiments described herein comprise a salt, for example sodium chloride, sodium sulfate, sodium bromide, ammonium sulfate, ammonium chloride, lithium chloride, lithium bromide, potassium chloride, potassium bromide, magnesium sulfate, aluminum sulfate, ammonium hydrogen phosphate, sodium hydrogen phosphate, potassium hydrogen phosphate, sodium salts, lithium salts, potassium salts, magnesium salts, aluminum salts, ammonium salts, phosphate salts, sulfate salts, chloride salts, fluoride salts, citrate salts, acetate salts, tartrate salts, hydrogenphosphate salts, water soluble inorganic salts, other inorganic salts and mixtures thereof. In exemplary embodiments, the salt is ammonium chloride or ammonium sulfate.

Inverting Surfactants

Among other things, the breaker or inverting surfactant may facilitate the inverting of the emulsion upon addition to the aqueous treatment fluids of the present embodiments. As those of ordinary skill in the art will appreciate, with the benefit of this disclosure, upon addition to the aqueous treatment fluid, the emulsion should invert, releasing the polymer into the aqueous treatment fluid. Examples of suitable inverting surfactants include, but are not limited to, ethoxylated alcohols, nonionic surfactant with an HLB of greater than 10, and mixtures thereof. An example of a suitable inverting surfactant comprises an ethoxylated $C_{12}$-$C_{16}$ alcohol, such as "SURFONIC® L24-7," available from Huntsman Performance Products. The inverting surfactant should be present in an amount sufficient to provide the desired inversion of the emulsion upon contact with the water in the aqueous treatment fluid. In an exemplary embodiment, the inverting surfactant may be provided in an amount of about 1% to about 5% by weight of the emulsion.

Emulsions

Water-in-oil emulsions, or oil-external emulsions, for use in the present embodiments are emulsions where a friction reducing polymer of the present embodiments is suspended in a water-in-oil polymer emulsion, the emulsion may comprise water, a water-immiscible liquid, an emulsifier, a friction reducing polymer, an inorganic salt, and an inverting surfactant. The emulsion may optionally comprise inhibitors.

The water present in the emulsions generally includes freshwater, but saltwater or combinations with saltwater also may be used. Generally, the water used may be from any source, provided that it does not contain an excess of compounds that may adversely affect other components in the emulsion. In some embodiments, the water may be present in the emulsion in an amount in the range of from about 35% to about 50% by weight of the emulsion.

Suitable water-immiscible liquids may include, but are not limited to, water-immiscible solvents, such as paraffin hydrocarbons, napthene hydrocarbons, aromatic hydrocarbons, olefins, oils, stabilizing surfactants and mixtures thereof. The paraffin hydrocarbons may be saturated, linear, or branched paraffin hydrocarbons. Examples of suitable aromatic hydrocarbons include, but are not limited to, toluene and xylene. An example of a suitable water-immiscible solvent comprising paraffin hydrocarbons is "LPA®-210", available from Sasol North America, Inc. In one embodiment, the water-immiscible liquid is an olefin and paraffin blend. In one embodiment, the water-immiscible liquid comprises oil and stabilizing surfactants. The water-immiscible liquid may be present in the emulsion in an amount sufficient to form a stable emulsion. In some embodiments, the water-immiscible liquid may be present in the emulsions in an amount in the range of from about 20% to about 30% by weight.

Emulsifiers, among other things, in the emulsion, lower the interfacial tension between the water and the water-immiscible liquid so as to facilitate the formation of a water-in-oil polymer emulsion. Emulsifiers are also referred to herein as primary surfactants or stabilizing surfactants. Examples of suitable emulsifiers include, but are not limited to, ethoxylated nonionic surfactants, guerbet alcohol ethoxylate, and mixtures thereof. An example of a suitable emulsifier comprises a tall oil fatty acid diethanolamine, such as "AMADOL® 511", available from Akzo Nobel Surface Chemistry. Another example of a suitable emulsifier comprises a polyoxyethylene (5) sorbitan monooleate, such as "TWEEN® 81," available from Uniqema. Another example of a suitable emulsifier comprises a sorbinate monooleate, such as "ALKAMULS® SMO," available from Rhone Poulenc, Inc. Another example of a suitable emulsifier is an ethoxylated $C_{12}$-$C_{16}$ alcohol, such as "SURFONIC® L24-7," available from Huntsman Performance Products. In certain embodiments, the emulsifier is a blend or mixture of more than one emulsifier, for example a mixture of an emulsifier than comprises sorbinate monooleate and an emulsifier that comprises an ethoxylated $C_{12}$-$C_{16}$ alcohol. In a particular embodiment, the emulsifier is a mixture of "ALKAMULS® SMO" and "SURFONIC® L24-7." The emulsifier should be present in an amount sufficient to provide the desired stable water-in-oil polymer emulsion. In some embodiments, the emulsifier may be present in an amount in the range of from about 0.5% to about 2.5% by weight of the emulsion.

The friction reducing polymers, salts and inverting surfactants that may be present in the water-in-oil emulsions are described above. The friction-reducing polymer should be present in the emulsion in an amount that does not undesirably impact the emulsion's stability. In some embodiments, the friction reducing polymer may be present in an amount in the range of from about 10% to about 35% by weight of the emulsion. In one embodiments, the salt may be present in the oil-external copolymer emulsions in an amount in the range of from about 0.5% to about the point of saturation of the aqueous phase of the emulsion. In some embodiments, the salt may be present in the oil-external copolymer emulsions in an amount in the range of from about 0.5% to about 2.5% by weight of the emulsion. In some embodiments, the inverting surfactant may be present in an amount in the range of from about 1% to about 5% by weight of the emulsion.

In some embodiments, the emulsions may further comprise an inhibitor. Among other things, the inhibitor may be included to prevent premature polymerization of the monomers prior to initiation of the emulsion polymerization reaction. As those of ordinary skill in the art will appreciate, with the benefit of this disclosure, the polymer may have been synthesized using an emulsion polymerization technique wherein the inhibitor acted to prevent premature polymerization. Examples of suitable inhibitors include, but are not limited to, quinones. An example of a suitable inhibitor comprises a 4-methoxyphenol (MEHQ). The inhibitor should be present in an amount sufficient to provide the desired prevention of premature polymerization. In some embodiments, the inhibitor may be present in an amount in the range of from about 0.001% to about 0.1% by weight of the emulsion.

In some embodiments, emulsion polymerization may be used to prepare a suitable emulsion that comprises a friction reducing polymer of the present embodiments. Suitable emulsion polymerization techniques may have a variety of different initiation temperatures depending on, among other things, the amount and type of initiator used, the amount and type of monomers used, the amount and type of inhibitor used, and a number of other factors known to those of ordinary skill in the art. In one embodiment, a suitable emulsion polymerization technique may have an initiation temperature of about 25° C. Due to the exothermic nature of the polymerization reaction, the mixture may be maintained at a higher temperature than the initiation temperature during procession of the polymerization reaction, for example, in the range of from about 30° C. to about 70° C., or from about 40° C. to about 60° C.

A variety of different mixtures may be used to prepare an emulsion for use in the present embodiments. Suitable mixtures may include acrylamide, acrylic acid, water, a water-immiscible liquid, an initiator, and an emulsifier. Optionally, the mixture further may comprise an inhibitor, a base (e.g., sodium hydroxide) to neutralize the acrylic acid forming the salt form of the friction reducing polymer, a complexing agent to allow the gradual release of monomers in the polymerization reaction, an activator to initiate polymerization at a lower temperature, and an inverter. Those of ordinary skill in the art, with the benefit of this disclosure, will, know the amount and type of components to include in the mixture based on a variety of factors, including the desired molecular weight and composition of the friction reducing polymer and the desired initiation temperature.

In one embodiment, the emulsion may comprise: a water-immiscible organic solvent in an amount of about 20% to about 25% by weight that comprises oil and stabilizing surfactants; a friction reducing polymer in an amount of about 10% to about 35% by weight that comprises acrylic acid or other anion monomer in an amount of about 10% to about 60% by weight of the friction reducing polymer; a salt in an amount of about 0.5% by weight to the point of saturation of the aqueous phase; an inverting surfactant in an amount of about 1% to about 5% by weight; and the balance water.

Treatment Fluid

The treatment fluid, for example a well treatment fluid, containing the emulsions described herein, can be used in any well treatment fluid where friction reduction is desired including but not limited to stimulation and completion operations. For example, the well treatment fluid can be used for hydraulic fracturing applications. Conventional fracturing fluids typically contain natural or synthetic water soluble polymers, which are well known in the art. Water soluble polymers viscosify the aqueous liquids at relatively low concentrations due to their high molecular weight.

In these applications, the fracturing fluid, i.e. well treatment fluid, can be configured as a gelled fluid, a foamed gel fluid, acidic fluids, water and potassium chloride treatments, and the like. The fluid is injected at a pressure effective to create one or more fractures in the subterranean formation. Depending on the type of well treatment fluid utilized, various additives may also be added to the fracturing fluid to change the physical properties of the fluid or to serve a certain beneficial function. In one embodiment, the fluid does not contain a sufficient amount of water soluble polymer to form a gel. Optionally, a propping agent such as sand or other hard material is added which serves to keep the fractures open after the fracturing operation. Also, fluid loss agents may be added to partially seal off the more porous sections of the formation so that the fracturing occurs in the less porous strata. Other oilfield additives that may also be added to the fracturing fluid include emulsion breakers, antifoams, scale inhibitors, $H_2S$ and or $O_2$ scavengers, biocides, crosslinking agents, surface tension reducers, breakers, buffers, surfactants and non-emulsifiers, fluorocarbon surfactants, clay stabilizers, fluid loss additives, foamers, friction reducers, temperature stabilizers, diverting agents, shale and clay stabilizers, paraffin/asphaltene inhibitors, corrosion inhibitors, and acids. For example, an acid may be included in the aqueous treatment fluids, among other things, for a matrix or fracture acidizing treatment. In fracturing embodiments, propping agent may be included in the aqueous treatment fluids to prevent the fracture from closing when the hydraulic pressure is released. In a particular embodiment, the treatment fluid further comprises a biocide.

Methods of Use

In one embodiment, methods for improving friction reduction properties of an aqueous treatment fluid, comprising: (i) providing a water in oil emulsion comprising: (a) from about 10% to about 30% by weight friction reducing polymer; (b) at least about 3% by weight of a salt; and (c) an inverting surfactant; and (ii) inverting the emulsion in an aqueous treatment fluid containing brine; wherein the resultant aqueous treatment fluid has an improvement in friction reduction, when compared to a similar aqueous treatment fluid in which the inverted emulsion that does not contain salt. In certain embodiments, the emulsion further comprises an emulsifier. In a particular embodiment, the salt is an inorganic salt. In one embodiment, the improved friction reduction property is the percent friction reduction of the aqueous treatment fluid. In one embodiment, the improvement in friction reduction is in the range of about 100% and about 1000%. In one embodiment, the improved friction reduction property is the time to achieve maximum friction reduction.

The aqueous treatment fluids of the present embodiments may be used in any subterranean treatment where the reduction of friction is desired. Such subterranean treatments include, but are not limited to, drilling operations, stimulation treatments, and completion operations. Those of ordinary skill in the art, with the benefit of this disclosure, will be able to recognize a suitable subterranean treatment where friction reduction may be desired.

In exemplary embodiments, a method of treating a portion of a subterranean formation is provided, comprising: providing an aqueous treatment fluid of the present embodiments comprising a water-in-oil emulsion as described herein, and introducing the aqueous treatment fluid into the portion of the subterranean formation. In some embodiments, the aqueous treatment fluid may be introduced into the portion of the subterranean formation at a rate and pressure sufficient to create or enhance one or more fractures in the portion of the subterranean formation. The portion of the subterranean formation that the aqueous treatment fluid is introduced will vary dependent upon the particular subterranean treatment. For example, the portion of the subterranean formation may be a section of a well bore, for example, in a well bore cleanup operation. In the stimulation embodiments, the portion may be the portion of the subterranean formation to be stimulated.

In exemplary embodiments, the methods may further comprise preparing the aqueous treatment fluid. Preparing the aqueous treatment fluid may comprise providing a water-in-oil emulsion as described herein, and combining the emulsion with water to form the aqueous treatment fluid.

In certain embodiments, the emulsions described herein provide improved or lower freezing points than similar emulsions prepared without the salt. In one embodiment, a method for improving or lowering the freezing point of an aqueous treatment fluid comprises: (i) providing a water in oil emulsion comprising: (a) from about 10% to about 35% by weight friction reducing polymer; (b) at least about 3% by weight of a salt; and (c) an inverting surfactant; and wherein the resultant emulsion has an improvement in freezing point, when compared to a similar emulsion that does not contain salt. In one embodiment, the method further comprises inverting the emulsion into an aqueous treatment fluid containing brine.

The following examples are presented for illustrative purposes only, and are not intended to be limiting.

EXAMPLES

In these examples, the impact of salt on friction reduction performance of friction reducing polymers was evaluated.

Materials and Methods:

I. Polymer Synthesis

General polymer synthesis was carried out using the inverse polymerization technique similar to those developed by Vanderhoff in 1950-60s. In these examples, anionic co-polymer emulsions were prepared and the following components/phases were required for the synthesis: acrylamide and acrylic acid (monomers), paraffin oil, stabilizing surfactant(s), ammonium chloride salt, initiator and a breaker surfactant (assist during inversion). The general procedure for the synthesis was as follows:

a. Preparation of the monomer phase.

In this step, the required amounts of acrylic acid (based on the anionic charge) and acrylamide were mixed together. A chelant was added and the mixture was stirred. The desired amount of salt (ammonium chloride or other) was added to the monomer mixture and allowed to dissolve. The pH of this mixture was adjusted to 6.0-6.5 range using ammonium hydroxide and was subsequently diluted with water (adjusted to required % actives).

b. Preparation of oil phase.

The oil phase was prepared separately by mixing the appropriate paraffin solvent with stabilizing surfactants.

c. The monomer phase was added to the oil phase and the two are allowed to mix for some time.

d. This mixture was then homogenized for a few seconds before transferring to the reaction vessel (reactor).

e. The contents of the reactor were sparged with nitrogen to remove dissolved oxygen for 1 hour while being stirred continuously.

f. Polymerization.

The initiator was added to the stirring mixture. Polymerization occurs that is signaled by an exotherm. This exotherm is controlled such that the temperature increase is at a certain rate and not rapid. Completion of polymerization is indicated when no raise in temperature is seen. However, the stirring and temperature is maintained at a predetermined level for ~2 hours.

g. After 2 hours, a scavenger is added, the temperature is brought back to room temperature and the breaker surfactant is added. Another 20 minutes of stirring is allowed after these additions.

h. The polymer is now ready and can be used as a friction reducer.

II. Brine Recipes

The following brines are the industry standard in a fracturing operation: (a) Fresh Water, (b) 2% KCl, (c) Sea Water, (d) API Brine, (e) 15% KCl, (f) Woodford Brine, (g) Cotton Valley Brine, and (h) Marcellus Brine. These are classified based on their increasing brine concentration. Table 1 provides the brine recipes and some properties.

TABLE 1

Brine compositions

| Brine Type | Salt Type | Amount of Salt in 20 L (g) | % | pH | Hardness (ppm, $Ca^{2+}$) | Hardness (ppm, $CaCO_3$) | TDS Divalent Cations (ppm) | Total TDS (ppm) |
|---|---|---|---|---|---|---|---|---|
| Tap Water | None | None | None | 5.86 | 24 | 60 | 11 | 53 |
| 2% KCl | KCl | 400 | 2.0 | 6.85 | 0 | 0 | 0 | 20,000 |
| Sea Water | Instant Ocean ® Sea Salt | 680 | 2.4 | 7.56 | 943 | 2356 | 1657 | 33,541 |
| API Brine | NaCl | 1700 | 8.5 | 7.55 | 22,558 | 56,394 | 9023 | 110,000 |
|  | $CaCl_2$ | 662.3 | 2.5 |  |  |  |  |  |
| 15% KCl | KCl | 3000 | 15.0 | 7.79 | 0 | 0 | 0 | 150,000 |
| Woodford Brine | NaCl | 1980 | 9.9 | 8.01 | 16,243 | 40,606 | 7959 | 122,800 |
|  | $CaCl_2$ | 476.87 | 1.8 |  |  |  |  |  |
|  | $SrCl_2$ | 26.86 | 0.1 |  |  |  |  |  |
|  | KCl | 20 | 0.1 |  |  |  |  |  |
|  | $MgCl_2$ | 170.82 | 0.4 |  |  |  |  |  |
| Marcellus Brine | NaCl | 2120 | 10.6 | 6.15 | 26,168 | 65,419 | 10,577 | 104,975 |
|  | $CaCl_2$ | 768.3 | 2.9 |  |  |  |  |  |
|  | KCl | 680 | 3.4 |  |  |  |  |  |
|  | $FeSO_4$ | 11 | 0.0 |  |  |  |  |  |
| Cotton Valley Brine | NaCl | 2731.3 | 13.7 | 8.4 | 48,100 | 120,250 | 22,942 | 324,662 |
|  | $CaCl_2$ | 804.4 | 4.0 |  |  |  |  |  |
|  | $MgCl_2$ | 101.6 | 0.5 |  |  |  |  |  |
|  | $BaCl_2$ | 24 | 0.1 |  |  |  |  |  |
|  | $FeCl_2$ | 0.14 | 0.0007 |  |  |  |  |  |

III. Polymer Friction Loop Testing

The friction loop is a laboratory instrument designed to simulate well fracturing flow conditions. Fracturing in the field often requires pumping over 50 barrels per minute through a ~4.5" bore which results in a highly turbulent flow (Reynolds number: 500,000 to 5,000,000). Although it is not possible to achieve this kind of flow in the lab, the friction loop designed simulates the field conditions to the maximum known extent (Reynolds number: 120,000). The data generated by this laboratory scale friction loop is accurate and widely accepted by the industry. The main components of the friction loop are: centrifugal pump, magnetic flow meter and a differential pressure transmitter to create and monitor necessary conditions. All pipes and other components are constructed using stainless steel 316L/304L material.

To test the friction reduction property of the polymer, the friction loop reservoir was filled with 20 L of the required brine (see above table for recipes of various brines). This brine was then re-circulated through the friction loop at a flow rate of 24 gallons per minute across a five-foot section of half-inch diameter pipe (required to generate the above mentioned Reynolds number). The baseline pressure drop was measured. The polymer was now added (at a measured concentration of 0.5 gallons of polymer per thousand gallons of brine or 0.5 GPTG) to the recirculating brine solution, where it inverted and dissolved. The degree of friction reduction (% FRt) at a given time 't' was calculated from the initial pressure drop ΔPi and the pressure drop at time t, ΔPt using the equation:

$$\%\ FR_t = \frac{\Delta P_i - \Delta P_t}{\Delta P_i} \times 100$$

Examples 1-36

The results of the friction loop testing for compositions of varying polymer, salt, oil type, surfactant, breaker combinations in sea water and fresh water are presented shown in Table 2.

TABLE 2

Friction loop test results in fresh water and sea water

| Ex. | Active Polymer Solids (wt %) | Salt Type | Salt Conc. (wt % on emulsion) | Freeze Point (°C.) | Max. FR in Fresh Water (%) | Time to Max. FR in Fresh Water (seconds) | Max. FR in Sea Water (%) | Time to Max. FR in Sea Water (seconds) |
|---|---|---|---|---|---|---|---|---|
| 1 | 15[a] | None | 0 | −10 | — | — | 7.19 | 248 |
| 2 | 15[a] | NH$_4$Cl | 1.5 | −15 | — | — | 14.75 | 118 |
| 3 | 15[a] | NH$_4$Cl | 3 | −15 | — | — | 38.1 | 29 |
| 4 | 15[a] | NH$_4$Cl | 6 | −20 | — | — | 43.86 | 28 |
| 5 | 15[a] | NH$_4$Cl | 12 | −30 | — | — | 47.83 | 16 |
| 6 | 15[a] | (NH$_4$)$_2$SO$_4$ | 3 | — | — | — | 33.56 | 43 |
| 7 | 15[a] | (NH$_4$)$_2$SO$_4$ | 6 | — | — | — | 38.65 | 31 |
| 8 | 15[a] | (NH$_4$)$_2$SO$_4$ | 12 | — | — | 74 | 44.72 | 24 |
| 9 | 15[a] | (NH$_4$)$_2$SO$_4$ | 15 | −30 | 53.33 | — | 41 | 32 |
| 10 | 15[a] | (NH$_4$)$_2$SO$_4$ | 16.5 | −30 | — | 23 | — | — |
| 11 | 15[a] | NH$_4$Cl | 12 | −30 | 54.29 | 22 | 43.86 | 18 |
| 12 | 15[a] | (NH$_4$)$_2$SO$_4$ | 12 | −30 | 53.83 | 40 | 45.2 | 18 |
| 13 | 15[a] | NH$_4$Cl | 12 | — | 14.21 | 42 | — | — |
| 14 | 15[a] | (NH$_4$)$_2$SO$_4$ | 12 | — | 14.57 | 296 | — | — |
| 15 | 15[a] | None | 0 | −10 | 21.06 | 287 | 3.02 | 8 |
| 16 | 15[a] | None | 0 | −15 | 25.09 | 91 | 1.84 | 163 |
| 17 | 15[a] | NH$_4$Cl | 3 | −15 | 39.53 | 95 | — | — |
| 18 | 15[a] | NH$_4$Cl | 6 | −15 | 40.28 | 64 | — | — |
| 19 | 15[a] | NH$_4$Cl | 9 | −20 | 44.2 | 47 | — | — |
| 20 | 15[a] | NH$_4$Cl | 12 | −30 | 47.34 | 75 | — | — |
| 21 | 15[a] | NH$_4$Cl | 3 | −15 | 40.72 | 97 | — | — |
| 22 | 15[a] | NH$_4$Cl | 6 | −20 | 42.99 | 74 | — | — |
| 23 | 15[a] | NH$_4$Cl | 9 | −30 | 46.06 | 36 | — | — |
| 24 | 15[a] | NH$_4$Cl | 12 | −45 | 49.48 | 125 | — | — |
| 25 | 15[a] | NH$_4$Cl | 12 | −30 | 39.02 | 68 | 28.86 | 43 |
| 26 | 15[a] | NH$_4$Cl | 12 | −35 | 46.39 | 38 | 51.7 | 22 |
| 27 | 15[b] | NH$_4$Cl | 10.1 | — | 44.99 | 34 | — | — |
| 28 | 15[c] | NH$_4$Cl | 10.1 | — | 46.28 | 17 | — | — |
| 29 | 15[b] | NH$_4$Cl | 10.1 | — | 49.13 | 31 | — | — |
| 30 | 15[c] | NH$_4$Cl | 10.1 | — | 49.03 | 156 | — | — |
| 31 | 28[a] | NH$_4$Cl | 8.7 | −25 | 54.36 | 89 | 49.85 | 52 |
| 32 | 25[a] | None | 0 | −15 | 53.24 | 201 | 15.46 | 272 |
| 33 | 25[a] | NH$_4$Cl | 7.5 | −25 | 53.86 | — | 48.19 | 100 |
| 34 | 25[a] | (NH$_4$)$_2$SO$_4$ | 7.5 | −25 | — | 214 | 39.27 | 108 |
| 35 | 15[a] | None | 0 | — | 61.14 | 47 | 37.48 | 214 |
| 36 | 15[a] | NH$_4$Cl | 12 | — | 65.91 | — | 61.87 | 40 |

Max. FR = maximum friction reduction;
[a] = 30 mole % polymer charge;
[b] = 10 mole % polymer charge;
[c] = 15 mole % polymer charge.

It was observed that including salt in the emulsion increased the friction reduction performance of the polymer emulsion in sea water over comparable emulsions without salt. In many instances, the amount of time to maximum friction reduction decreased with increasing amounts of salt in the emulsions.

The emulsions used for Examples 35 and 36 were also tested in harsher brines. The results are shown in Table 3. Brine compositions are shown in Table 1 above.

TABLE 3

Friction loop test results comparing polymer emulsions with and without salt in fresh water and various brines

| Example | 35 | 36 |
|---|---|---|
| Active Polymer Solids (wt %) | 15[a] | 15[a] |
| Salt Type | None | NH$_4$Cl |
| Salt Conc. (wt % on emulsion) | 0 | 12 |
| Max. FR in Fresh Water (%) | 61.14 | 65.91 |
| Time to Max. FR in Fresh Water (seconds) | 214 | 47 |
| Max. FR in Sea Water (%) | 37.48 | 61.87 |
| Time to Max. FR in Sea Water (seconds) | 214 | 40 |
| Max. FR in 2% KCl (%) | 47.29 | 64.41 |
| Time to Max. FR in 2% KCl (seconds) | 32 | 65 |
| Max. FR in API Brine (%) | 31.48 | 51.57 |
| Time to Max. FR in API Brine (seconds) | 214 | 44 |
| Max. FR in Cotton Valley Brine (%) | 30.97 | 38.7 |
| Time to Max. FR in Cotton Valley Brine (seconds) | 209 | 70 |
| Max. FR in Marcellus Brine(%) | 33.14 | 32.09 |
| Time to Max. FR in Marcellus Brine (seconds) | 214 | 107 |

"Max. FR" = maximum friction reduction;
"[a]" = mole % polymer charge.

Generally, as the harshness of the brines increased (increasing TDC and hardness corresponds with increasing harshness), the friction reduction performance decreased. However, in many instances, when salt was included in the emulsion, friction reduction performance of the polymer emulsion improved.

What is claimed is:

1. A method of improving friction reduction properties of an aqueous treatment fluid, comprising:
   (i) providing a water in oil emulsion comprising:
      (a) from about 10% to about 35% by weight friction reducing polymer;
      (b) at least about 3% by weight of a salt; and
      (c) an inverting surfactant; and
   (ii) inverting the emulsion in an aqueous treatment fluid containing brine;
   wherein the resultant aqueous treatment fluid has an improvement in friction reduction, when compared to a similar aqueous treatment fluid in which the inverted emulsion does not contain salt.

2. The method of claim 1, wherein the salt is an inorganic salt.

3. The method of claim 1, wherein the friction reducing polymer comprises about 10% to about 60% anionic monomers by weight.

4. The method of claim 1, wherein the anionic monomer is acrylic acid.

5. The method of claim 1, wherein the salt is present in an amount of about 0.5% to the point of saturation of the aqueous phase of the emulsion.

6. The method of claim 1, wherein the friction reducing polymer comprises a latex polymer, or a copolymer of acrylamide, acrylate, or combinations thereof.

7. The method of claim 1, wherein the friction reducing polymer is an anionic polymer.

8. The method of claim 1, wherein the friction reducing polymer is a cationic polymer.

9. The method of claim 1, wherein the friction reducing polymer is an amphoteric polymer.

10. The method of claim 1, wherein the friction reducing polymer is a non-ionic polymer.

11. The method of claim 1, wherein the brine comprises sea water; naturally-occurring brine; a chloride-based, bromide-based, formate-based, or acetate-based brine containing monovalent and/or polyvalent cations or combinations thereof.

12. The method of claim 2, wherein the inorganic salt is ammonium chloride or ammonium sulfate.

\* \* \* \* \*